(12) United States Patent
Gupta

(10) Patent No.: US 10,509,906 B2
(45) Date of Patent: *Dec. 17, 2019

(54) AUTOMATED CODE LOCKDOWN TO REDUCE ATTACK SURFACE FOR SOFTWARE

(71) Applicant: Virsec Systems, Inc., San Jose, CA (US)

(72) Inventor: Satya Vrat Gupta, Dublin, CA (US)

(73) Assignee: Virsec Systems, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/645,288

(22) Filed: Jul. 10, 2017

(65) Prior Publication Data

US 2018/0004950 A1  Jan. 4, 2018

Related U.S. Application Data

(63) Continuation of application No. 15/021,513, filed as application No. PCT/US2015/037470 on Jun. 24, 2015, now Pat. No. 9,727,729.

(Continued)

(51) Int. Cl.
*G06F 11/00* (2006.01)
*G06F 12/14* (2006.01)
(Continued)

(52) U.S. Cl.
CPC ............ *G06F 21/566* (2013.01); *G06F 21/52* (2013.01); *G06F 21/554* (2013.01)

(58) Field of Classification Search
CPC combination set(s) only.
See application file for complete search history.

(56) References Cited

U.S. PATENT DOCUMENTS 6,654,877 B1 * 11/2003 Huck .................... G06F 9/3842
                                                          712/227
6,782,478 B1   8/2004 Probert
(Continued)

FOREIGN PATENT DOCUMENTS

| CN | 1711526 A | 12/2005 |
|---|---|---|
| CN | 101021886 A | 8/2007 |
| CN | 102375957 A | 3/2012 |

OTHER PUBLICATIONS

Attack Surface Reduction for Commodity OS Kernels, by Anil Kurmus, Alessandro Sorniotti and Rudiger Kapitza.*
(Continued)

*Primary Examiner* — Phy Anh T Vu
(74) *Attorney, Agent, or Firm* — Hamilton, Brook, Smith & Reynolds, P.C.

(57) ABSTRACT

In an example embodiment, a system determines a set of instructions from the available instructions for a computer application. The determined set of instructions provides specific functionality of the computer application. The system may determine the set of instructions by performing functional testing and negative testing on the specific functionality. The system may reorganize and randomize the set of instructions in memory and write the reorganized set of instructions to a smaller memory space. For each available instruction not in the set of instructions, the system changes the respective instruction to inoperative to prevent execution of the respective instruction. The system may change the respective instruction to inoperative by overwriting the instruction with a NOP instruction. The system then captures a memory address of the computer application being accessed at runtime. The system may declare a security attack if the captured memory address matches a memory address for an inoperative instruction.

27 Claims, 11 Drawing Sheets

Related U.S. Application Data

(60) Provisional application No. 61/998,320, filed on Jun. 24, 2014.

(51) Int. Cl.
*G06F 12/16* (2006.01)
*G06F 21/56* (2013.01)
*G06F 21/52* (2013.01)
*G06F 21/55* (2013.01)

(56) References Cited

U.S. PATENT DOCUMENTS

| | | | |
|---|---|---|---|
| 7,559,082 B2 | 7/2009 | Morgan | |
| 7,624,449 B1* | 11/2009 | Perriot | G06F 21/563 726/22 |
| 7,908,660 B2 | 3/2011 | Bahl | |
| 8,307,432 B1 | 11/2012 | Feng | |
| 8,578,483 B2 | 11/2013 | Seshadri | |
| 8,958,546 B2 | 2/2015 | Probert | |
| 9,230,455 B2 | 1/2016 | Probert | |
| 9,460,284 B1 | 10/2016 | Hajmasan | |
| 9,636,449 B2* | 5/2017 | Mehta | A61M 3/0287 |
| 9,727,729 B2 | 8/2017 | Gupta | |
| 2002/0013938 A1* | 1/2002 | Duesterwald | G06F 8/4435 717/160 |
| 2003/0023732 A1* | 1/2003 | Cohen | H04L 29/06 709/229 |
| 2004/0015712 A1* | 1/2004 | Szor | G06F 21/566 726/24 |
| 2004/0168078 A1* | 8/2004 | Brodley | G06F 21/52 713/190 |
| 2007/0182983 A1* | 8/2007 | Wyatt | G06F 21/50 358/1.15 |
| 2007/0250703 A1* | 10/2007 | Giraud | G06F 21/52 713/154 |
| 2007/0288794 A1 | 12/2007 | Cousin | |
| 2008/0271147 A1* | 10/2008 | Mohanan | G06F 21/552 726/24 |
| 2009/0183154 A1* | 7/2009 | Miskelly | G06F 9/485 718/100 |
| 2009/0320136 A1* | 12/2009 | Lambert | G06F 21/554 726/25 |
| 2010/0011441 A1* | 1/2010 | Christodorescu | G06F 21/53 726/24 |
| 2010/0017879 A1* | 1/2010 | Kuegler | G06F 21/123 726/23 |
| 2010/0037033 A1* | 2/2010 | Karecha | G06F 21/552 711/217 |
| 2012/0060217 A1* | 3/2012 | Sallam | G06F 21/566 726/23 |
| 2013/0086338 A1* | 4/2013 | Blainey | G06F 9/3017 711/156 |
| 2013/0239223 A1* | 9/2013 | Park | G06F 21/60 726/26 |
| 2013/0305366 A1* | 11/2013 | Lim | G06F 21/56 726/23 |
| 2013/0305368 A1* | 11/2013 | Ford | G06F 21/568 726/23 |
| 2014/0108803 A1 | 4/2014 | Probert | |
| 2014/0181976 A1* | 6/2014 | Snow | G06F 21/53 726/23 |
| 2014/0337639 A1 | 11/2014 | Probert | |
| 2015/0143452 A1* | 5/2015 | Hamlen | G06F 21/51 726/1 |
| 2015/0213260 A1* | 7/2015 | Park | G06F 21/54 726/23 |
| 2015/0363598 A1* | 12/2015 | Xu | G06F 21/563 726/23 |
| 2016/0094349 A1 | 3/2016 | Probert | |
| 2017/0083701 A1 | 3/2017 | Tajalli | |
| 2018/0307831 A1* | 10/2018 | Anand | G06F 21/54 |

OTHER PUBLICATIONS

"Reduced attack surface corresponding to Type 1 cross-site scripting attacks using secure development life cycle practices, Syed Nisar Bukhari, Muneer Ahnnad Dar, Ummer Iqbal, Feb. 27-28, 2018, IEEE, INSPEC#18133589" (Year: 2018).*

"Reduce Attack Surface via Executable Transformation, Sukarno Mertoguno, Ryan Craven, Daniel Killer, Matthew Mickelson, Sep. 30-Oct. 2, 2018, IEEE, INSPEC#18274360" (Year: 2018).*

"Attack Surface Expansion Using Decoys to Protect Virtualized Infrastructure, Tulha Al-Salah, Liang Hong, Sachin Shetty, Jun. 25-30, 2017, IEEE, INSPEC#17188751" (Year: 2017).*

International Search Report and Written Opinion of PCT/US2015/037470 dated Sep. 9, 2015 entitled "Automated Code Lockdown to Reduce Attack Surface for Software".

Kurmus, A., et al. "Attack Surface Reduction for Commodity OS Kernels", System Security, ACM, pp. 1-6, Apr. 10, 2011.

Matzner, S. and Hetherington, T., "Detecting Early Indications of a Malicious Insider", In IA newsletter, vol. 7, pp. 42-45, 2004.

Nguyen, N., et al., "Detecting Insider Threats by Monitoring System Call Activity", In Information Assurance Workshop, 2003, IEEE Systems, Man and Cybernetics Society, pp. 45-52, Jun. 2003.

Schonlau, M., et al., "Computer intrusion: Detecting masquerades", In Statistical Science, pp. 58-74, Feb. 2001.

Maxion, R., "Masquerade Detection Using Enriched Command Lines", In International Conference on Dependable Systems & Networks (DSN-03), pp. 5-14, 2003.

Wang, K. and Stolfo, S., "One Class Training for Masquerade Detection", In 3rd IEEE Conference Data Mining Workshop on Data Mining for Computer Security, Nov. 2003.

Szymanski, B. and Zhang, Y., "Recursive Data Mining for Masquerade Detection and Author Identification", In Proc. 5th IEEE System, Man and Cybernetics Information Assurance Workshop, pp. 424-431, Jun. 2004.

Yeung, D., and Ding, Y., "User Profiling for Intrusion Detection Using Dynamic and Static Behavioral Models", In Proceedings of the 6th Pacific-Asia Conference on Advances in Knowledge Discovery and Data Mining, pp. 494-505, 2002.

Spitzner, L., "Honeypots: Catching the Insider Threat", In 19th Annual Computer Security Applications Conference, pp. 170-179, 2003.

Forrest, S., et al., "A Sense of Self for Unix Processes", In Proceedings of 1996 IEEE Symposium on Computer Security and Privacy, 1996.

Hofmeyr, S., et al., "Intrusion Detection Using Sequences of System Calls", In Journal of Computer Security vol. 6, pp. 151-180, 1998.

Liao, Y. and Vemuri, V., "Using Text Categorization Techniques for Intrusion Detection", In Proc. 11 USENIX Security Symposium, pp. 51-59, Aug. 2002.

Bay, S. and Schwabacher, M., "Mining Distance-Based Outliers in Near Linear Time with Randomization and a Simple Pruning Rule", In ninth ACM SIGKDD International Conference on Knowledge Discovery and Data Mining (KDD-2003), 2003.

Breunig, M., et al., "LOF: identifying density-based local outliers" In Proceedings of the 2000 ACM SIGMOD International Conference on Management of data, pp. 93-104, 2000.

Anderson, R., "Understanding the Insider Threat", RAND National Defense Research Institute, 2004.

Schultz, E., "A framework for understanding and predicting insider attacks", In Computers & Security, vol. 21, Jun. 2002.

Swets, J. and Pickett, R., "Evaluation of Diagnostic Systems: Methods from Signal Detection Theory", Academic Press, 1992.

Maxion, R. and Townsend, T. "Masquerade Detection Using Truncated Command Lines", In International Conference on Dependable Systems and Networks (DSN-02), pp. 219-228, IEEE Computer Society Press, 2002.

Eskin, M., et al., "Adaptive Model Generation for Intrusion Detection Systems. Workshop on Intrusion Detection and Prevention", 7th ACM Conference on Computer Security, Nov. 2000.

Eskin, E., et al. "A Geometric Framework for Unsupervised Anomaly Detection: Detecting Intrusions in Unlabeled Data. Data Mining for Security Applications", Kluwer 2002.

(56) References Cited

OTHER PUBLICATIONS

International Preliminary Report on Patentability for PCT/US2015/037470 dated Dec. 27, 2016 entitled "Automated Code Lockdown to Reduce Attack Surface for Software".
Wartell, R., et al. "Binary Stirring: Self-randomizing Instruction Addresses of Legacy x86 Binary Code", Proceedings of the 2012 ACM Conference on Computer and Communications Security, CCS '12, pp. 157-168, Oct. 16, 2012.

* cited by examiner

Golden Table

| Code Block Enumeration | Start Address | End Address |
|---|---|---|
| Block 1 | 0x74305600 | 0x74305620 |
| Block 2 | 0x74305640 | 0x74305645 |
| Block 3 | 0x75215720 | 0x75215730 |
| Block 4 | 0x77985250 | 0x77985270 |
| . . . | . . . | . . . |
| Block N | 0x79866721 | 0x79866729 |

FIG. 4

AUTOMATED CODE LOCKDOWN TO REDUCE ATTACK SURFACE FOR SOFTWARE

RELATED APPLICATIONS

This application is a continuation of U.S. application Ser. No. 15/021,513, filed Mar. 11, 2016, which is the U.S. National Stage of International Application No. PCT/US2015/037470, filed on Jun. 24, 2015, which designated the United States and was published in English, which claims the benefit of U.S. Provisional Application No. 61/998,320, filed on Jun. 24, 2014. The entire teachings of the above applications are incorporated herein by reference.

BACKGROUND

With each passing day, cyber-attacks are becoming increasingly sophisticated. Attacks are targeted to exploit specific vulnerabilities in specific applications. The cause and effects of such attacks are not discernible at the network layer because they do not trigger network activity that appears to be overtly malicious. Applications executed on enterprise systems are preferred targets for attackers since highly valuable information, such as credit card numbers, customer social security numbers, and other personally identifiable information, are accessible from these applications. In order to deal with these targeted attacks, many vendors have deployed cyber security products, such as next generation firewalls which attempt to learn the behavior of the user, or sandboxing technologies which attempt to run what appears to be suspicious code in a sandbox and waits for such suspicious code to perform malicious activities. In these scenarios, malware often adapts its behavior, such as waiting for a longer period of time to carry out its malicious intent. Since these products must give up attempting to detect the behavior at some point and deliver user traffic to the intended recipient, the attacks simply wait out this time of detection. These changes in behavior hamper the deployed cyber security products' ability to recognize the behavior of the attack and, therefore, their ability to detect the presence of malware is greatly diminished.

SUMMARY

A large number of malware attacks of computer applications today result from the ability of a malicious actor to inject, and later execute, malicious content in a process running the application. The method of injecting such malicious content involves identifying and exploiting poorly designed application code that performs inadequate input validation. The current cyber security technologies either attempt to observe malicious content in the application, trace the behavior of the application, or screen the behavior of suspicious code in a sandbox. These technologies do not have the capability to lockdown instructions of a computer application to prevent the injection and execution of malicious content in the application code. In addition, these technologies do not have the capability to track and correlate attempts to access the locked down code in order to accurately identify malware attacks before the malware successfully carries out its malicious intent.

Many enterprise systems execute computer applications comprised of general purpose code that includes software functionality not used by the enterprise, or a class of users at the enterprise. By determining the code that corresponds to the unused software functionality, and disabling the instructions for the code, the attack surface to inject malicious content is significantly reduced (i.e., locked down). Disabling the unused instructions provides substantial benefit by minimizing the points in which malicious actors can attack the applications, while not affecting the experience of a user executing the applications. As a result of the lockdown, any device executing these computer applications, such as desktop computers, laptop computers, mobile, or other forms of personal computers, internet ready devices (e.g., cell phones), set top boxes, MP3 players, gaming consoles, or other devices communicatively coupled to these devices, are better protected against malware attacks.

The present disclosure is directed to example systems and methods for locking down instructions for a computer application in order to detect and prevent malware attacks. The systems and methods determine a set of instructions from the available instructions for the computer application. The determined set of instructions provides specific functionality of the computer application. In example embodiments, the specific functionality may be dependent on the class of user executing the application. In some embodiments, the systems and methods determine the set of instructions by performing functional testing on the specific functionality of the computer application and capturing the instructions executed during the functional testing. In some of these embodiments, the systems and methods may further determine the set of instructions by performing negative testing on the specific functionality. The negative testing triggers exception handling functions respective to the specific functionality, and the systems and methods capture the instructions executed by the triggered exception handling functions. In other embodiments, the systems and methods capture the instructions for the exception handling functions by statically analyzing the structure of the threads executing the specific functionality during the functional testing. The systems and methods may write the memory addresses for the set of instructions to a table for loading on a hardware processor. In some embodiments, the systems include an instrumentation engine configured to determine the set of instructions from the available instructions of the computer application.

In some embodiments, the systems and methods may reorganize the set of instructions in memory and write the reorganized set of instructions to a smaller memory space. In these embodiments, the systems and methods may randomize the reorganized set of instructions prior to writing them to a smaller memory space. In some embodiments, the instrumentation engine is configured to reorganize and randomize the set of instructions, and in these and other embodiments, the instrumentation engine may also be configured to write the memory addresses for the reorganized instructions to the table.

Once the set of instructions are determined, for each available instruction not in the set of instructions, the systems and methods change the respective instruction to inoperative to prevent execution of the respective instruction. The systems and methods may change the respective instruction to inoperative permanently or temporarily. In some embodiments, the systems and methods may change the respective instruction to inoperative by overwriting the respect instruction with an inoperative instruction during load time. In other embodiments, the systems and methods may change the respective instruction to inoperative by overwriting the respective instruction with an inoperative instruction during runtime. The systems and methods may change the respective instruction to inoperative by overwriting the respective instruction with a no operation (NOP)

instruction. In some embodiments, the instrumentation engine is configured to change the respective instruction to inoperative.

After changing the instructions to inoperative, the systems and methods may capture a memory address of the computer application being accessed at runtime. In some embodiments, the systems include an analysis engine, communicatively coupled to the instrumentation engine, and configured to capture the memory address. The systems and methods may declare a security attack if the captured memory address matches a memory address for an inoperative instruction. In some embodiments, the systems include a validation engine, communicatively coupled to the analysis engine and the instrumentation engine, and configured to declare the security attack.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 4 illustrates an example table for storing the active instructions for an application.

DETAILED DESCRIPTION

A description of example embodiments follows.

Overview of Malware Attacks

The National Vulnerability Database (NVD) enumerated approximately 4100 application vulnerabilities in 2011 and approximately 5300 application vulnerabilities in 2012, which are divided into twenty-three attack categories. While a few of the attack categories involve attacks resulting from negligence or misconfiguration, the largest number of attack categories involve a malicious actor purposely injecting, and later causing execution of, malicious content in an executing process of an organization. The process of injecting such malicious content involves identifying and exploiting some poorly designed code that performs inadequate input validation. For example, if the code lacks in size related validation, the code may allow buffer error style attacks included in the Buffer Errors attack category. In these attacks, the malicious actors are injecting malicious content in an attempt to mine information from the executing process for accessing confidential information, such as credit card data, intellectual property, social security numbers, from the organization. The malicious actor may then use this confidential information to profit by stealing resources from the organization or customers of the organization.

Example Malware Attacks

Figure 1:
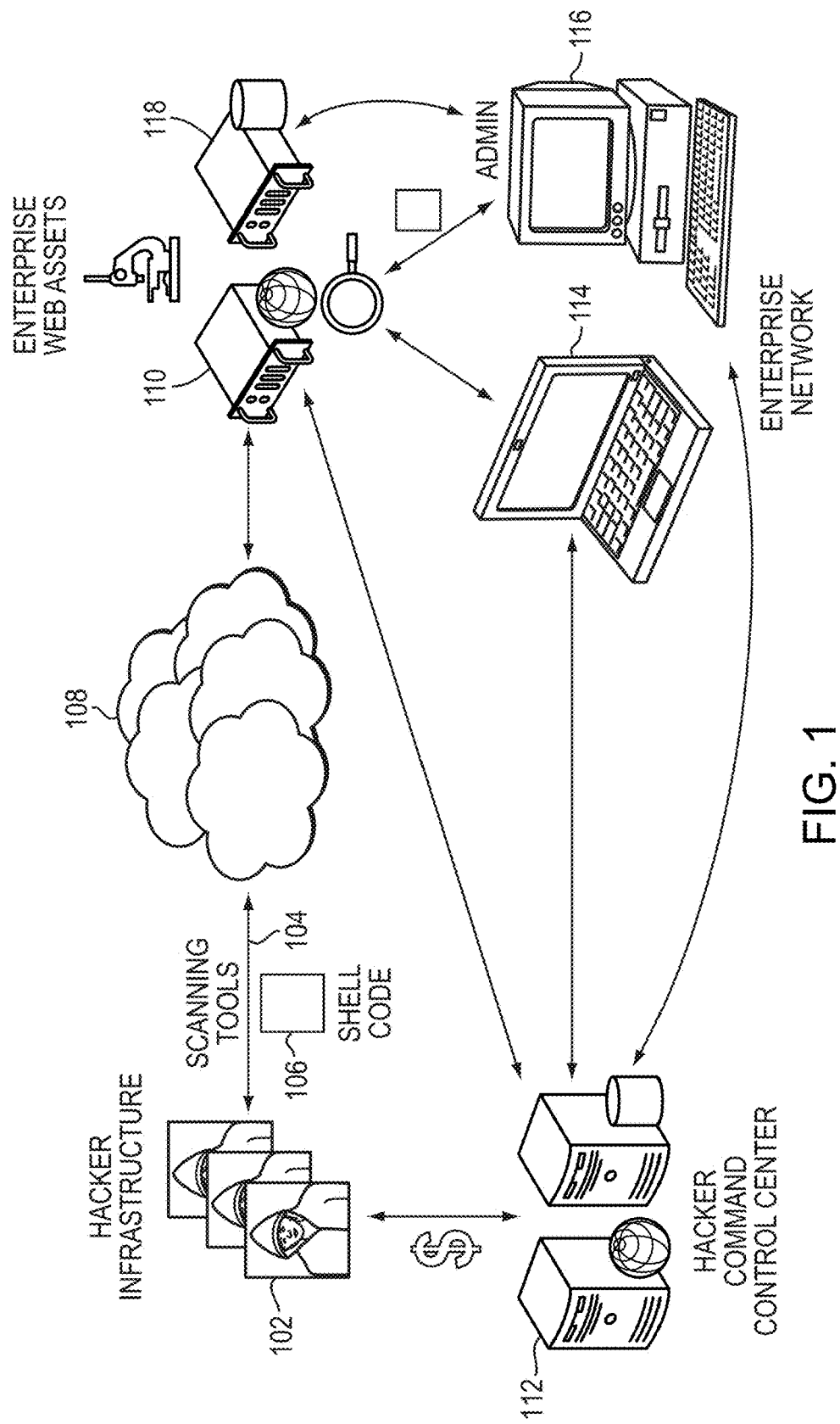
FIG. 1 illustrates an example configuration of an advanced persistent malware attack.

FIG. 1 illustrates an example of an advance persistent malware attack. In this scenario, a malicious actor (or hacker) from the actor's own infrastructure 102 remotely scans the web facing the infrastructure of an enterprise 108 using scanning tools such as nmap 104. When the scan finds a server that has either a known vulnerability or zero-day vulnerability, the actor installs shell code 106 to gain control of the remote enterprise server (i.e., target) 110 and access the enterprise network. Once inside the network, the malicious actor loads additional tools. These tools may include nmap, port scanners, password cracking tools, ftp client, compression tools, hashing, and/or encryption and decryption tools.

The actor then accesses the enterprise infrastructure looking for a machine 114 or 116 from which elevated privileged users log into valuable targets, such as databases and file repositories. The actor is looking for the machine 114 or 116 for the purposes of scraping the access credentials of the user and for finding a home for more hacking tools. Upon finding a machine with vulnerable applications 114 or 116, the malicious actor can scrape for credentials, infiltrate and subsequently access the target 110. Once the target is accessed, additional tools of the trade are loaded onto the target 110. Malware can also be deposited onto mobile devices such as smartphones and laptops of privileged users as they take their machines through unprotected networks such as coffee shops, airports, and hotels. In another scenario, an inside user may infect the target machines with viruses or other malware attacks. By using sophisticated password cracking tools or snooping intranet traffic, the malware can obtain the credentials of the administrative user 116.

Enterprise databases are preferred targets for malicious actors since highly valuable information may be access by a privileged user. For example, in these databases, a privileged user has access to large chunks of confidential customer information regarding many users, while a regular user only has access to parts of the confidential information pertinent to themselves. After credentials have been obtained, the malicious actor can connect to the databases and file repositories 118 as a privileged user and extract the valuable confidential information, such as real names, home addresses, social security, driver licenses, birth dates, medical records, financial information such as credit/debit card numbers, phone numbers, email addresses, user names and passwords, insurance information, detailed customer lists, design plans, and source code or other intellectual property.

The malicious actor can optionally compress and encrypt this information and upload it to the Hacker Command Control Center 112 in small chunks so as to not draw attention of the enterprise security analysts. To achieve this objective, the malicious actor may change the IP addresses of the Hacker Command Control Center 112 on a daily basis or use proxies so that intrusion detection systems in the enterprise cannot establish a pattern. An enterprise typically sends and receives over 10 GB of data every day; therefore uploading relatively small amounts of data in short bursts often goes unnoticed.

The vulnerability of an application 114 or 116 to a malware attack is directly proportional to the amount of code in the application (i.e., the attack surface). By determining the specific code executed by each class of users (e.g., privileged users), and changing the instructions for the rest of the code to inoperative, the attack surface for an actor to inject malicious content into the application is minimized. More specifically, the probability that the malicious actor will find vulnerabilities to inject malicious content, such as poorly designed code, is reduced in proportion to the number of instructions changed to inoperative, thereby protecting the application against malicious attacks. Further, the vulnerability of an application 114 or 116 to a malware attack may be increased if instruction blocks for the application are consistently loaded in the same location and sequence. By determining the specific instructions accessed by a class of user, those instructions may be reorganized and randomized in memory for each system. As such, even if a malicious actor locates a vulnerability in the minimized attack surface of the application, the malicious actor is prevented from using the same vulnerability to attack the application on another system.

Lockdown Process

Figure 2:
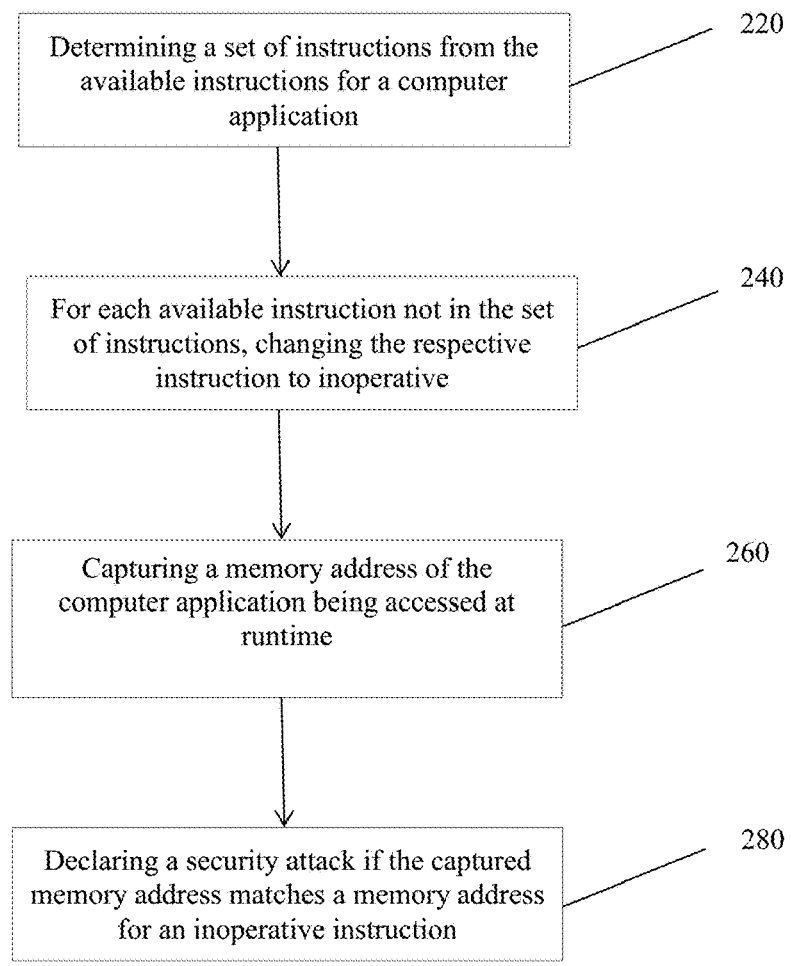
FIG. 2 illustrates a flowchart of an example method for locking down instructions of a computer application.

FIG. 2 illustrates a flowchart of an example method 200 for locking down instructions of a computer application. The method 200 may be used to reduce the attack/threat surface of the computer application in order to detect and prevent security attacks. The method 200 begins at step 220 by an instrumentation engine determining a set of instructions from the available instructions for the computer application. The set of instructions may correspond to specific functionality of the application used by an organization, or a class of users of the organization, whereas the available instructions correspond to all the functionality of the application. That is, an application vendor often delivers to an organization an application that includes functionality not used by the organization for all classes of users of the organization. For example, the organization as a whole may only use a subset of the functionality, and further, different classes of users (e.g., normal users, privileged users, administrators) may only use a fraction of that subset. The instrumentation engine may determine the instructions for the specific functionality actually used by the organization and used by different classes of users of the organization.

In some embodiments, the instrumentation engine may determine the set of instructions using a dynamic process. In this process, the specific functionality used by the organization, or a class of user of the organization, may be exercised, which in turn executes the object code blocks corresponding to the functionality. The specific functionality may be exercised using various methods, including functionality testing and negative testing, which tests the code blocks' handling of invalid input or unexpected behavior in regards to the functionality. In some embodiments, the testing may performed manually by human testers, and in other embodiments, the testing may be performed automatically by a test tool. Further, in some embodiments, the specific functionality for an organization, or a class of user of the organization, may be determined from documentation provided by the application vendor or requirements provided by the organization to the vendor (e.g., use cases). In other embodiments, the complete functionality for an organization, or a class of user of the organization, may be determined based on examining all application commands as indicated in a graphical interface or command-line interface provided as part of the application, or the functionality may be learned over a period of time as the user executes the application under real-world conditions. In yet other embodiments, the information technology, or other such department of an organization, may select the functionality available to different classes of users and configure the application accordingly.

As the code blocks corresponding to the functionality are executed, the instrumentation engine studies the behavior of the code and captures the generated instructions (e.g., assembly code instructions) for the code. For each code block, the instrumentation engine may store the memory addresses for the generated instructions in tables, such as in golden tables of an instrumentation database. In some embodiments, the memory addresses for a code block of instructions are stored as a range. The instrumentation engine may further transmit the tables to an analysis engine, which may write the tables in memory or other storage elements on the analysis engine for quick referencing of the set of instructions.

In some embodiments, the instrumentation engine may determine the set of instructions using a static process. In this process, the instrumentation engine may use code analysis to disassemble the executables and libraries for the application. For example, the executables and libraries containing the specific functionality for the application may be provided by the vendor in library files, such as in dynamic link libraries (DLLs). The instrumentation engine may disassemble the library files, and trace the functions, libraries (e.g., import/export/jump libraries), and data for the functionality used by an organization, or class of user of the organization, to determine the code blocks corresponding to the functionality. The executables and libraries corresponding to the specific functionality may be determined from documentation related to the dynamic link libraries (e.g., API documentation) provided by the application vendor.

As the instrumentation engine disassembles the library files, for each code block, the instrumentation engine may store the memory addresses for the respective instructions in tables, such as in a golden tables of an instrumentation database. In some embodiments, the memory addresses for a code block of instructions are stored as a range. The instrumentation engine may further transmit the tables to an analysis engine, which may write the tables to a hardware processor for quick references of the set of instructions.

At step 240, for each available instruction not in the set of instructions, the instrumentation engine changes the respective instruction to inoperative. More specifically, the instrumentation engine retrieves the memory addresses for the set of instructions determined in step 220. The instrumentation engine may retrieve the memory addresses stored in a table, such as a golden table. The instrumentation engine may then traverse the complete range of memory addresses for the application. If a traversed memory address does not correspond to a memory address retrieved for the set of active instruction, then the instrumentation engine changes the respective instruction to inoperative. In other embodiments, if a traversed memory address range does not correspond to a memory address range retrieved for the set of instruction, then the instrumentation engine changes the respective range of instructions to inoperative.

In some embodiments, the instrumentation engine permanently changes the instructions to inoperative, and in other embodiments, the instrumentation engine temporarily changes the instructions to inoperative. In the embodiments that the instrumentation engine temporarily changes the instructions, the instrumentation engine stores a copy of the original instructions and respective memory addresses to change one or more of the inoperative instructions back to the original instructions during a future reload of the application. In the embodiment that the instrumentation engine permanently changes the instructions, the inoperative instructions persist across reloads of the application. The instrumentation engine may change the respective instructions to inoperative by overwriting the instructions with inoperative instructions during runtime or during load time. In some embodiments, the instrumentation engine may determine to overwrite the respective instructions at either runtime or load time based on the source code being self-generating or interpretive source code. The instructions engine may change the respective instructions to inoperative by overwriting the instruction with an inoperative instruction (or NOP) or equivalent inoperative instruction. The instructions for the application that are not changed to operative may hereinafter be referred to as active instruction.

By rendering the unused instructions inoperative, the lockdown process provides multiple benefits to the organization executing the application. The lockdown process reduces the attackable code surface of the application, so as the inoperative instructions cannot be used to conduct exploits. The lockdown process may further reduce the attackable surface of the application, by locking down the instructions based on class of users of the organization. For example, the code may be lockdown further for a normal user, who constitutes the primary user of the application, than an administrator, who may represent a small fraction of users. Further, the organization may need to implement fewer patch releases for the application, as the patches may be for functionality changed to inoperative in the application instructions. The fewer patches results in less downtime for the enterprise system, which, in turn, results in increased productivity and cost savings for the organization.

In addition, in example embodiments, the instrumentation engine may reorganize the stored memory addresses for the active instructions used by the organization, or class of user of the organization. The instrumentation engine reorganizes the memory addresses in a manner that retains the relative address relationships of the respective instructions (e.g., redirecting memory pointers). In some embodiments, while reorganizing the memory addresses, the instrumentation engine may also randomize the memory address locations. The instrumentation engine may then write the active instructions to a smaller memory address space and write the memory addresses in a different sequence and location on each system in which the application is loaded. As such, if a malicious actor locates and exploits vulnerability in the application on one system, then the malicious actor will not be able to locate the same vulnerability to exploit on a different system.

At step 260, an analysis engine, which may be communicatively coupled to the instrumentation engine, captures a memory address of the application being accessed at runtime. Then, if the analysis engine determines that the captured memory address matches a memory address for an inoperative instruction, then then analysis engine may communicate the event to a vulnerability engine. The analysis engine may compare the memory address to the golden table of active memory addresses corresponding to active instructions, and if the address is not in the table, then communicate the event to the validation engine. In some embodiments, the analysis engine may access the golden table on a hardware process for faster processing. At step 280, the validation engine, which may be communicatively coupled to the analysis engine and instrumentation engine, may then declare a security attack. In other embodiments, the vulnerability engine may correlate the event in a state machine to detect the security attack.

Determination of Functionality

Figure 3:
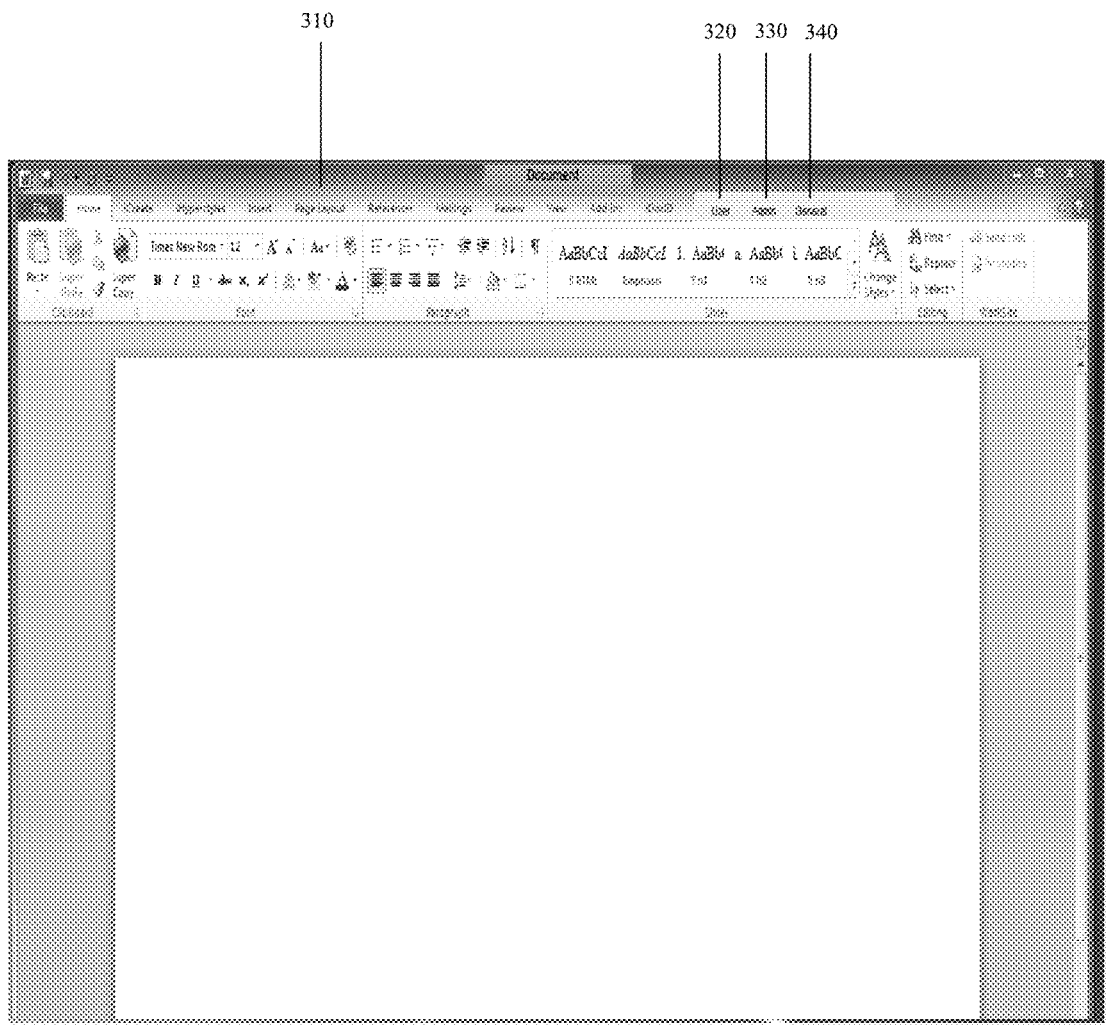
FIG. 3 illustrates an example computer application with functionality based on organization and class of user of the organization.

FIG. 3 illustrates an example computer application with functionality based on class of user. The example computer application may be delivered from the application vendor to an organization. The application may include standard functionality 310 provided by the application vendor. The application may further include general functionality provided specifically for the organization, referred to as General 340, and particular functionality based on the class of users in the organization. For example, the application may include functionality specific to the class of users referenced to as User 320. For further example, the application may include functionality specific to a more privileged class of user referred to as Admin 330. The General 340, User 320, and Admin 330 functionality may be based on application requirements for features requested by the organization from the vendor (e.g., use cases), while the standard functionality 310 may be provided to all organizations using the application.

Individuals at the organization may only use a subset of the standard functionality 310 for the application. For example in FIG. 3, the organization may only use the standard Home functionality, and may remove access for all other standard functionality (e.g., iCreate, Mailing, etc.) from the application interface. Although, the organization may have removed access to the unused functionality, the instructions for the code are still active in memory on the system, and may still provide a vulnerability through which malicious actors may exploit the application. Using a method similar to the method of FIG. 2, a human tester or automated test tool may exercise all the options provided in regards to the Home functionality, such as Paste, Super Copy, etc. As the options are exercised, the instrumentation engine may capture the corresponding instructions for the options, and record the memory addresses corresponding to the instructions in a table.

Further, in some embodiments, all individuals at the organization may use the general functionality 340, but the User functionality 320 and Administration 330 may only be used by the respective class of users. For example, the organization may have removed access to the Admin functionality 330 for the User class. However, the instructions respective to the Admin functionality 330 are still active in memory while the individual executes the application, and may still provide a vulnerability in which malicious actors may exploit the application. Using a method similar to the method of FIG. 2, a human tester or automated test tool may exercise all the options available to the individual of class User (e.g., User functionality 320 and General functionality 340). As the options are exercised, the instrumentation engine may capture the corresponding instructions for the options, and record the memory addresses corresponding to the instructions in a table.

After all the options available to the User are exercised, the instrument engine may then traverse through all the instructions for all the functionality 310, 320, 330, 340 of the application. If the memory address for a traversed instruction is not present in the table, then the memory address may be changed to inoperative (e.g. NOP). As such, in the present example, as an individual of the User class executes the application, only the instructions for the Home option of the Standard functionality 310, the General functionality 340, and the User functionality are active, and the instructions for the Admin functionality 330 are inoperative (i.e., inactive). Thus, as the individual executes the application, the instructions for the Admin functionality 330 cannot provide a vulnerability for a malicious actor (including an individual from another class of user) to exploit the application, thereby eliminating potential for malicious attacks on the application. Further, the instrumentation engine may detect that the malicious actor attempted to access inoperative code, and generate a security event based on this event.

Golden Table

FIG. 4 illustrates an example table for storing the active instructions for an application. In this embodiment, the table is referred to as a golden table. As specific functionality for a computer application is exercised (e.g., functionality of FIG. 3), the host system, in turn, executes the code blocks corresponding to the functionality. The instrumentation engine captures the generated instructions (e.g., assembly code instructions) for each code block. As shown in FIG. 4, the instrumentation engine records an enumeration for each executed code block in the golden table. Further, the instrumentation engine records the start memory address and end memory address for the range of captured instructions for the respective code block. The golden table may be stored in a database at the instrumentation engine or at the analysis engine. In some embodiments, the golden table is also loaded on a hardware process for fast referencing of the code blocks and corresponding memory addresses recorded in the golden table. Note, a separate golden table may be created for each class of user executing the application, and for each system in which the application is loaded.

When memory addresses of the application are accessed, the analysis engine checks whether the accesses memory addresses matches memory addresses in the golden table. In some embodiments, the analysis engine checks the memory addresses individually, and in other embodiments, the analysis engine checks the range of memory addresses for a code block. If the accessed memory addresses are not in the golden table, the analysis engine may report the event to the validation engine to declare (or correlate) a security attack. Note, in this embodiment the golden table contains memory addresses for all the active code blocks, however, in other embodiments, the golden table may instead contain the memory addresses for all the inoperative code blocks. In these other embodiments, the analysis engine checks whether the accessed memory addresses are in the golden table, and may report the event to the validation engine to declare the security attack.

Determination of Active Instructions

Figure 5A:
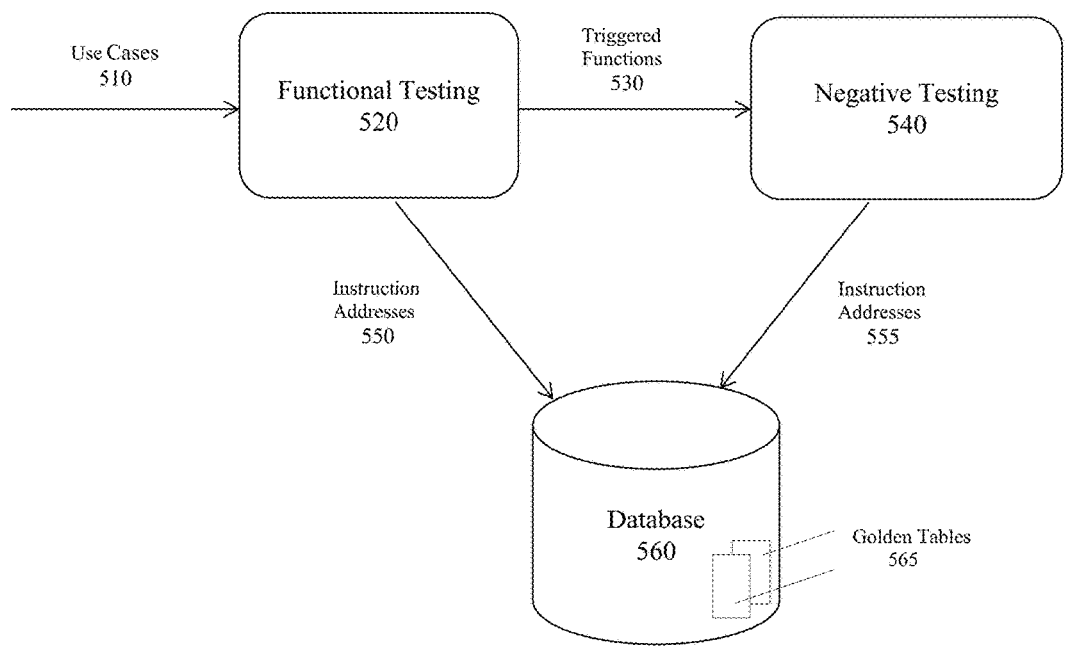
FIG. 5A illustrates a block diagram of an example configuration for capturing instructions that execute required functionality of a computer application.

FIG. 5A illustrates a block diagram of an example configuration for capturing instructions that execute required functionality of a computer application.

An organization or the application vendor may provide a requirements document to application developers specifying in detail the functionality of the application needed by the organization or the application vendor. The requirements document may organize the needed functionality as use cases 510, which identify the possible scenarios in which the organization or the application vendor may use the needed functionality (and all the respective parameters relevant to each scenario). The organization may further specify in the requirements document the different functionality needed by different classes of users. As such, the requirements document may include specific use cases 510 for each of these different classes of users.

The application vendor may then deliver to the organization a version of the application that includes all standard functionality for the application. If all or part of the needed functionality specified by the organization (i.e., use cases) is not included in the standard functionality, then the vendor may further incorporate this needed functionality into the version of the application. As such, the delivered version of the application includes all the needed functionality for the organization, but also includes standard functionality not used by the organization, as shown in FIG. 3. Further, the delivered version of the application includes all the needed functionality for a particular class of user of the organization, but also includes unneeded functionality for that particular class of user that instead corresponds to other classes of users of the organization, as also shown in FIG. 3.

In order to exercise all the functionality needed by the organization, the organization may test the complete set of use cases 510 provided to the vendor. Further, in order to exercise all the functionality needed by a class of user of the organization, the organization may test the complete set of use cases 510 provided to the vendor for that class of user. The organization may employ manual human testers, automated test tools, or a combination of both to perform functional testing 520 according to the use cases 510. The automated test tools may include one or more of the numerous automated test tools available for functionality testing 520 based on use cases 510. The functionality testing 520 may be performed by selecting command options for the application using an application interface (e.g., graphical interface and command-line interface) or instrumenting code that executes command options (or associated code) for the application.

Prior to performing the functionality testing 520, the instrumentation engine may be configured to monitor the execution of the computer application. As such, at application load time, the instrumentation engine may insert instructions into modules of the application or execute processes separate from the application to monitor the activities of the application (e.g., stack, heap, and system calls). Then, as the functionality testing is performed, the instrumentation engine may determine the code blocks being executed, and capture the generated instructions (e.g., assembly code instructions) for the code block. For each code block, the instrumentation engine may store the memory addresses 550 for the generated instructions in a golden table 565 of the database 560. In some embodiments, the golden tables are formatted as shown in FIG. 4. The functionality testing 520 may be performed for all functionality required or used by the entire organization, and the instructions for the respective functionality is stored in a first golden table 565. The functionality testing 520 may instead be performed for all functionality required for a particular class of user, and the instructions for the respective functionality may be stored in a second golden table 565. Similarly, the functionality testing 520 may instead be performed for each other class of user, and the instructions for the respective functionality may be stored in a separate golden table 565.

Based on the functionality testing 520, the instrumentation engine may perform negative testing 540 to further capture instructions related to the need functionality for the organization, or classes of users of the organization. Specifically, negative testing 540 tests the handling of invalid input or unexpected behavior in regards to the needed functionality (e.g., exception handling). As the functionality testing is performed, the instrumentation engine may monitor the triggered functions (e.g., system calls) 530 being generated by executing the code blocks of the application. The instrumentation engine may then use this information to perform negative testing 540 by simulating context specific errors (e.g., exception handling) relative to the need functionality. The simulated errors may include disk full, file sharing violations, and memory exhaustion. As the negative testing 540 is performed, the instrumentation engine may determine the code blocks being executed, and capture the generated instructions (e.g., assembly code instructions) for the code block. For each code block, the instrumentation engine may store the memory addresses 555 for the generated instructions in a golden table 565 of the database 560. The memory addresses 555 from the negative testing 540 may be stored in the same or separate golden tables 565 as the memory addresses 550 from the functionality testing.

In other embodiments, the negative testing 540 may be performed statically. In these embodiments, the instrumentation engine may determine the instructions for the exception handling functions by statically analyzing the structure of the threads executing the specific functionality during the functional testing. For example, in the x86 CPU architecture, pointers to registered exception handlers are loaded in thread control blocks. In some embodiments, the instrumentation engine may determine the instructions for the exception handling functions by statically analyzing the executable image. For example, in the x64 CPU architecture, the exception handlers are present in a separate section in the executable image itself. For each code block, the instrumentation engine may store the memory addresses 555 for the determined instructions in a golden table 565 of the database 560. The memory addresses 555 from the negative testing 540 may be stored in the same or separate golden tables 565 as the memory addresses 550 from the functionality testing.

Lockdown Modes

Figure 5B:
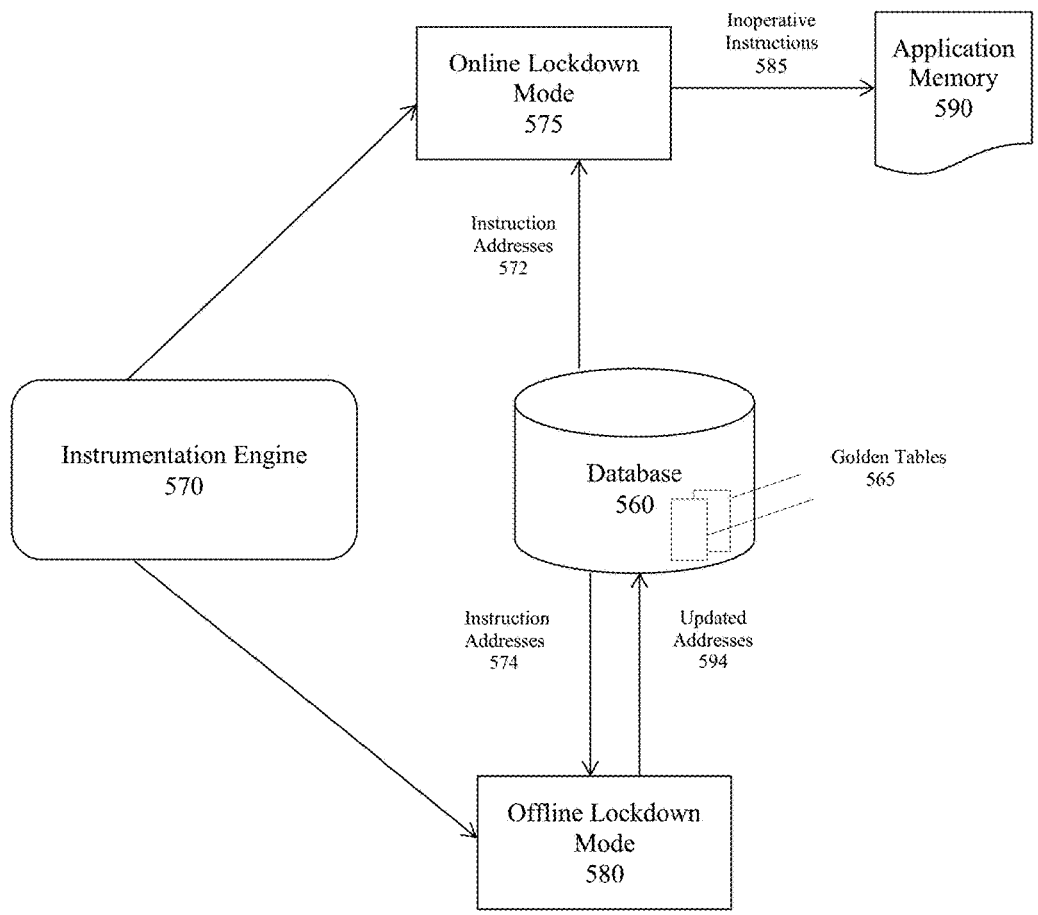
FIG. 5B illustrates a block diagram of an example configuration for locking down instructions in online mode and offline mode.

FIG. 5B illustrates a block diagram of an example configuration for locking down instructions for an application. In the embodiment of FIG. 5B, the instructions may be locked down by an instrumentation engine 570 in either online lockdown mode 575 or offline lockdown mode 580.

Online Lockdown Mode

The instrumentation engine 570 may be configured in online lockdown mode 575 for overwriting unused instructions for the application. The instrumentation engine 570 may be configured to temporarily or permanently overwrite each unused instruction. In the embodiments that the instrumentation engine 570 temporarily overwrites the unused instructions, the instrumentation engine 570 stores a copy of the unused instructions and respective memory addresses to rewrite one or more of the inoperative instructions back to the unused instructions during a future reload of the application. In the embodiment that the instrumentation engine 570 overwrites the instruction permanently, the inoperative instructions persist across reloads of the application. The instrumentation engine 570 may first load all the memory addresses 572 from one or more golden tables 565 in the database 560. The loaded golden tables 565 corresponding to all the functionality needed when executing the application. For example, different golden tables 565 may be loaded for different classes of users, as the functionality needed for each respective class of user may vary. If the application does not contain self-generating or interpretative code (e.g., Javascript), after loading the application into memory, the instrumentation engine 570 may perform the application lockdown. That is, the instrumentation engine 570 may traverse all the memory addresses for the loaded application. If a traversed memory address does not correspond to an instruction address 572 loaded from the golden tables 565, the instrumentation engine 570 overwrites the corresponding instruction. The instrumentation engine may overwrite the instruction in application memory 590 by changing the instruction to an inoperative instruction 585 (e.g., NOP instruction) appropriate to the CPU architecture of the system executing the application.

If the application does contain self-generating or interpretive code, then the instrumentation engine 570 may perform the application lockdown during runtime (i.e., in real time). As such, the instrumentation engine needs to perform the application lockdown for each execution of the application. To overwrite the unused instructions for the application, the instrumentation engine 570 monitors the CPU instruction cache to determine the instructions about to be executed by a system process. If the memory address of the instruction about to be executed does not corresponds to an instruction address 572 loaded from the golden tables 565, the instrumentation engine 570 overwrites the corresponding instruction. Otherwise, the instrumentation engine 570 allows the instruction to continue loading into the execution pipeline for the application. Note, in some embodiments, even if the application does not contains self-generating or interpretive code, the instrumentation engine 570 may still be configured to perform application lockdown during runtime instead of load time. Further, in some embodiments, some instructions for an application may be locked down at load time, and other instructions for the same application may be locked down at runtime.

Offline Lockdown Mode

The instrumentation engine 570 may be configured to offline lockdown mode 580 for optimizing the active code for an application. If the application does not include self-modifying or interpretive code, the instrumentation engine 570 may first load the instruction addresses 574 from one or more golden tables 565 of the database 560, as the set of active instructions for a specific set of functionality for the application. The instruction addresses 574 may be loaded according to their respective code blocks. The instrumentation engine 570 may then reorganize the code blocks, and instructions in the code blocks, such that the instructions encompass a smaller memory space, such as smaller executable or library modules. The instrumentation engine 570 may further randomize the memory addresses of the instructions, as part of the reorganization. The reorganizing and randomizing involves updating the memory addresses of the instructions in a manner that preservers all relative address relationships between the instructions (e.g. memory pointers). The instrumentation engine 570 may write the code blocks with the updated memory addresses to the host system as executables or libraries for use the next time that the application is loaded.

Further, for each code block, the instrumentation engine 570 may then write the updated memory addresses 594 back to the golden tables 565, replacing the previous memory address for the respective code block. Then, the next time that the instrumentation engine is configured in online lockdown mode, the updated memory addresses will be used to overwrite the unused instructions. When malicious actors discover a new vulnerability, the actors often depend on hardcoded attack vectors for performing the attack, such as code blocks being in the same location on all machines of the same architecture. By reorganizing and randomizing instructions, if a malicious attack succeeds in exploiting one machine in a particular code block, the same attack will not work in another machine at the same location.

Attack Chain of Events

Figure 6:
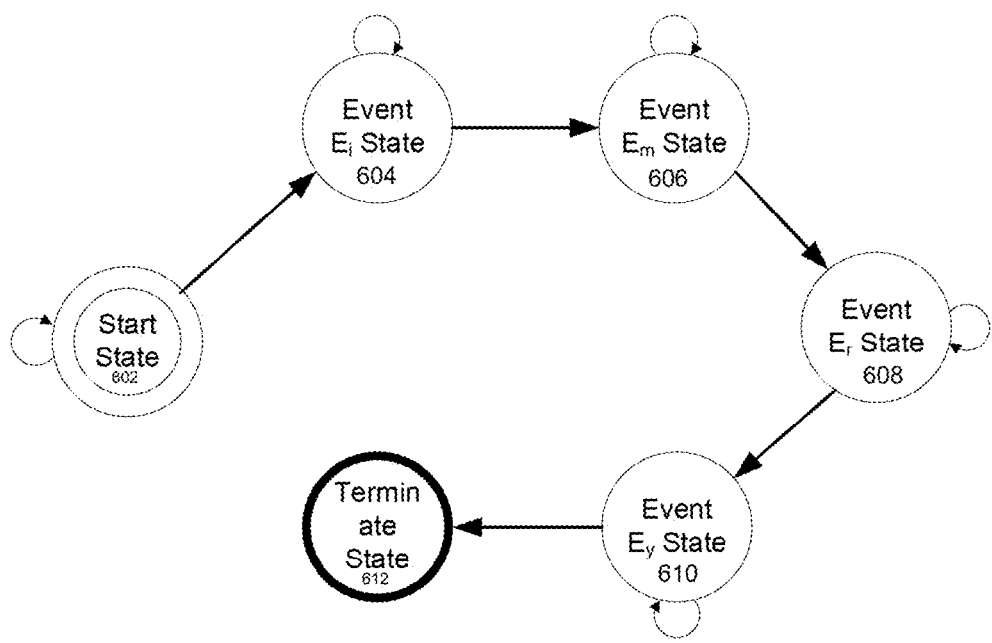
FIG. 6 illustrates an example Event Chain State Machine used to track generated events in embodiments of the present disclosure.

FIG. 6 depicts an Event Chain State Machine used to correlate detected security events using a chain of events process. Being able to detect and block the chain of events for malicious attack scenarios is a key component of thwarting such advanced persistent threats. One detected event that may be correlated in the chain of events is the accessing of memory addresses that contain application instructions set to inoperative, as shown in FIG. 2. As the instructions contained in these memory addresses are unused by the class of user executing the application, the accessing of the memory addresses must be by an outside user, such as a malicious actor. This event, correlated with other detected events, may together indicate an attack scenario where the malicious actor is attempting to mine data from the application process for use to access confidential resources.

Prior cyber security tools depend on security analysts to set the threshold of events that signify an attack. For example, one security analyst may have internalized that some number of port scans and login attempts per hour will occur in the normal course of the day. The question then becomes how many port scan attempts per source per hour are one too many before an alert is triggered. Further, if an alert is generated for every port scan, an analyst may be investigating port scans with no malicious intent. If an alert is raised too late or never due to raised thresholds, then the malware attack may have succeeded already. Furthermore, these tools have an incomplete knowledge base to effectively detect the attack, and as such, these tools generate so many false positives that the typical security analyst gets drowned by the noise. The ability to generate truly genuine alerts requires the cyber security tools to distinguish between benign and malicious events precisely and reliably. A malicious actor would be aware of the same set of signatures or known suspicious network or application behaviors. Therefore, the malicious actor can weaken the detection of the attack, such as using encryption to encode the data, changing IP and port combinations, or by slowing down the attack so as to avoid detection based on the behavior specified in the knowledge base.

In contrast, in the present disclosure, a Path Validation Engine tracks the state of security events in accordance with the Event Chain State Machine shown in FIG. 6. The Event Chain State Machine uses records stored in various internal databases, such as a Transition Playbook Database to track these events. When a new thread starts, the Event Chain State Machine is initialized to Start State at 602. An Event Management Engine 723 serializes events, such as shown in FIG. 2, so that the set of events on one thread are updated on the state machine for the appropriate thread. As transitions occur on the thread, the state machine records the target address but stays in the Start State. When the Path Validation Engine generates a medium or high severity event, the Event Chain State Machine advances to the next state, the $E_i$, state at 604. This new state continues to record the target address of transitions as they occur. This process of the state machine updating to a new state on medium and high severity events and recording transition events continues at 606, 608, and 610 until the thread reaches the Terminate State at 612. The Security Analyst is notified when a highest severity level event is triggered and the Event Chain State Machine captures the forensics when an attack occurs.

Depending on the modes of the system, there are various remedial actions that can be taken in response to such security events. The remedial actions taken can be performed in real-time. One remedial action may consist of shutting down the web application. Other remedial actions may be to release the socket(s) associated with the threads on which the threat has appeared; terminate the thread on which a threat has appeared, and/or blacklisting the user that caused the threat. Another remedial action would be to unblock all sockets associated with the application server's socket(s). This will block all users connected at the time. Another remedial action would be to logout the offending user by removing his/her session ID from the database. The next request or response would then not be delivered to the attacker. Yet another remedial action may be to ignore the attack. This may be due to the analyst not considering the attack to be of major consequence. The most appropriate suggested remedial actions for a given event are pre-programmed so that if the security analyst has chosen to operate the Analysis Engine in automatic mode, the remedial action occurs automatically.

The Path Validation Engine of the Analysis Engine can be run in three modes: Monitor or Paranoid mode. The difference between these modes is how and when to enforce the remedial actions associated with the event(s) received on a given thread in the application. In the Monitor mode, as runtime information arrives and is analyzed by the Analysis Engine, it generates notifications that are directed to the designated security analysts. It is then the security analyst's job to intervene and choose the most appropriate remedial action. The security analyst may decide to change an "ignore" type pre-programmed remedial action to a higher impact remedial action even before the thread has reached the Terminate State. On finalizing the remedial action, the Analysis Engine implements the remedial action when the appropriate authority in the enterprise clears the proposed remedial action for a given thread.

In the paranoid mode, the programmed (default or user configured) remedial action is executed automatically without any manual intervention from the security analyst. In either mode, once the remedial action is ready to be carried out, the analysis engine lets the Monitoring Agent know which remedial action to carry out. The Monitoring Agent then performs the action associated with the remedial action on the application. Once the remedial action is completed, the Monitoring Agent sends a confirmation message back to the analysis engine. On receiving the acknowledgement, the analysis engine performs housekeeping including updating the security analyst.

In learning mode, the analysis Engine ignores all events and remedial actions. In this mode, the application runs in a pristine environment and records all events and event chains. The security analyst uses this information to build criteria for when an event should be raised and what remedial action should be associated with the said event.

Monitoring Agent and Analysis Engine Infrastructure

Figure 7A:
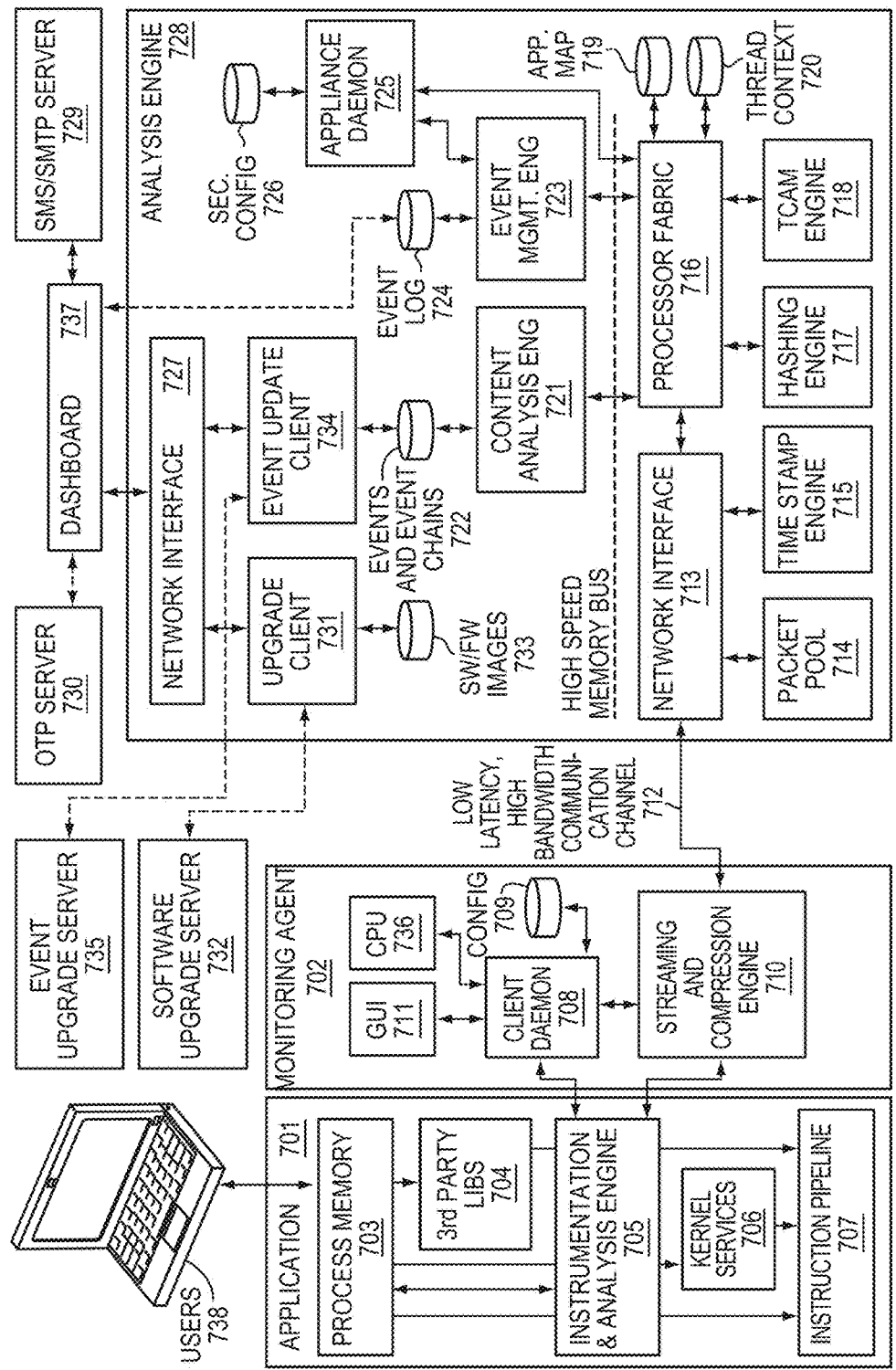
FIG. 7A illustrates an example block diagram of the client and analysis engine in embodiments of the present disclosure.

FIG. 7A depicts a high level block diagram of an example Monitoring Agent and Analysis Engine infrastructure. This infrastructure may be configured on a various hardware including computing devices ranging from smartphones, tablets, laptops, desktops to high end servers. As shown in this figure, data collection performed by the Monitoring Agent 702 may be segregated from analysis performed by the analysis Engine to improve application performance. The infrastructure provides high availability to prevent hackers from subverting its protection against malware attacks. The Monitoring Agent 702 interacts with an application to gather load time and runtime data. The infrastructure of the application 701 includes process memory 703, third-party libraries 704, kernel services 706, and an instruction pipeline 707. The infrastructure of the Monitoring Agent 702 includes the Instrumentation & Analysis Engine (instrumentation engine) 705, graphical user interface (GUI) 711, Client Daemon 708, Configuration database 709, and Streaming and Compression Engine 710, and central processing unit (CPU) 736. Local or remote users 738 of the application 701 interact with the application either through devices like keyboards, mice or similar I/O devices or over a network through a communication channel that may be established by means of pipes, shared memory or sockets. In response the application process 703 dispatches appropriate sets of instructions into the instruction pipeline 707 for execution. The application may also leverage its own or third party libraries 704 such as libc.so (Linux) or msvcrtxx.dll (Windows). As functionality from these libraries is invoked, appropriate instructions from these libraries are also inserted into the instruction pipeline for execution 707. In addition the application may leverage system resources such as memory, file I/O etc. from the kernel 706. These sequences of instructions from the application, libraries and the kernel put together in a time ordered sequence deliver the application functionality desired by a given user.

As the application's code begins to load into memory, the Instrumentation and Analysis Engine (i.e., instrumentation engine) 705 performs several different load time actions. Once all the modules have loaded up, the instrumented instructions of the application generate runtime data. The Client Daemon 708 initializes the Instrumentation and Analysis Engine 705, the Streaming Engine 710 and the GUI 711 processes in the CPU at 736 by reading one or more configuration files from the Configuration database 709. It also initializes intercommunication pipes between the instrumentation engine, Streaming Engine, GUI, Instrumentation & Analysis Engine 705 and itself. The Client Daemon also ensures that if any Monitoring Agent process, including itself, becomes unresponsive or dies, it will be regenerated. This ensures that the Monitoring Agent 702 is a high availability enterprise grade product.

The Instrumentation and Analysis Engine 705 pushes load and runtime data collected from the application into the Streaming Engine. The Streaming Engine packages the raw data from the Monitoring Agent 702 into the PDU. Then it pushes the PDU over a high bandwidth, low latency communication channel 712 to the Analysis Engine 728. If the Monitoring Agent 702 and the Analysis Engine 728 are located on the same machine this channel can be a memory bus. If these entities are located on different hardware but in the same physical vicinity, the channel can be an Ethernet or Fiber based transport, which allows remote connections to be established between the entities to transport the load and runtime data across the Internet.

The infrastructure of the Analysis Engine 728 includes the Network Interface Card (NIC) 713, the Packet Pool 714, the Time Stamp Engine 715, the Processor Fabric 716, the Hashing Engine 717, the TCAM Engine 718, the Application Map database 719, and the Thread Context database 720, which may contain a table of the memory addresses used by a class of user executing an application monitored by the system. The infrastructure of the Analysis Engine 728 further includes the Content Analysis Engine 721, the Events and Event Chains 722, the Event Management Engine 723, the Event Log 724, the Application Daemon 725, the Analysis Engine Configuration database 726, the Network Interface 727, the Dashboard or CMS 737, the SMS/SMTP Server 729, the OTP Server 730, the Upgrade Client 731, the Software Upgrade Server 732, Software Images 733, the Event Update Client 734, and the Event Upgrade Server 735.

The PDU together with the protocol headers is intercepted at the Network Interface Card 713 from where the PDU is pulled and put into the Packet Pool 714. The timestamp fields in the PDU are filled up by the Time Stamp Engine 715. This helps to make sure that no packet is stuck in the packet Pool buffer for an inordinately long time.

The Processor Fabric 716 pulls packets from the packet buffer and the address fields are hashed and replaced in the appropriate location in the packet. This operation is performed by the Hashing Engine 717. Then the Processor Fabric starts removing packets from the packet buffer in the order they arrived. Packets with information from the load time phase are processed such that the relevant data is extracted and stored in the Application Map database 719. Packets with information from the runtime phase are processed in accordance with FIG. 5. The efficiency of the Analysis Engine 728 can be increased or decreased based on the number of processors in the Processor Fabric.

The transition target data is saved in the Thread Context database 720 which has a table for each thread. The Processor fabric also leverages the TCAM Engine 718 to perform transition and memory region searches. Since the processor fabric performing lookups using hashes, the actual time used is predictable and very short. By choosing the number of processors in the fabric carefully, per packet throughput can be suitable altered.

When the Analysis Engine 728 performs searches, it may, from time to time find an invalid transition, invalid operation of critical/admin functions or system calls, or find a memory write on undesirable locations. In each of these cases, the Analysis Engine 728 dispatches an event of the programmed severity as described by the policy stored in the Event and Event Chain database 722 to the Event Management Engine 723. The raw event log is stored in the Event Log Database 724. The Dashboard/CMS 737 can also access the Event Log and display application status.

A remedial action is also associated with every event in the Event and Event Chain database 722. A user can set the remedial action from a range of actions from ignoring the event in one extreme to terminating the thread in the other extreme. A recommended remedial action can be recommended to the analyst using the Event Update Client 734 and Event Upgrade Server 735. In order to change the aforementioned recommended action, an analyst can use the Dashboard/CMS 737 accordingly. The Dashboard/CMS 737 provides a GUI interface that displays the state of each monitored application and allows a security analyst to have certain control over the application, such as starting and stopping the application. When an event is generated, the Event Chain advances from the normal state to a subsequent state. The remedial action associated with the new state can be taken. If the remedial action involves a non-ignore action, a notification is sent to the Security Analyst using and SMS or SMTP Server 729. The SMS/SMTP address of the security analyst can be determined using an LDAP or other directory protocol. The process of starting or stopping an application from the Dashboard/CMS 737 requires elevated privileges so the security analyst must authenticate using an OTP Server 730.

New events can also be created and linked into the Event and Event Chain database 722 with a severity and remedial action recommended to the analyst. This allows unique events and event chains for a new attack at one installation to be dispatched to other installations. For this purpose, all new events and event chains are loaded into the Event Upgrade Server 735. The Event Update Client 734 periodically connects and authenticates to the Event Upgrade Server 735 to retrieve new events and event chains. The Event Update Client then loads these new events and event chains into the Events and Events Chain database 722. The Content Analysis Engine 721 can start tracking the application for the new attacks encapsulated into the new event chains.

Just as with the Client Daemon, the Appliance Daemon 725 is responsible for starting the various processes that run on the Analysis Engine 728. For this purpose, it must read configuration information from the Analysis Engine Configuration database 726. The daemon is also responsible for running a heartbeat poll for all processes in the Analysis Engine 728. This ensures that all the devices in the Analysis Engine ecosystem are in top working condition at all times. Loss of three consecutive heartbeats suggests that the targeted process is not responding. If any process has exited prematurely, the daemon will revive that process including itself.

From time to time, the software may be upgraded in the Appliance host, or of the Analysis Engine 728 or of the Monitoring Agent 702 for purposes such as fixing errors in the software. For this purpose, the Upgrade Client 731 constantly checks with the Software Upgrade Server 732 where the latest software is available. If the client finds that the entities in the Analysis Engine 728 or the Monitoring Agent 702 are running an older image, it will allow the analysts to upgrade the old image with a new image from the Software Upgrade Server 732. New images are bundled together as a system image 733. This makes it possible to provision the appliance or the host with tested compatible images. If one of the images of a subsystem in the Analysis Engine 728 or the Monitoring Agent 702 does not match the image for the same component in the System image, then all images will be rolled to a previous known good system image.

PDU for Monitoring Agent and Analysis Engine Communication

Figure 7B:
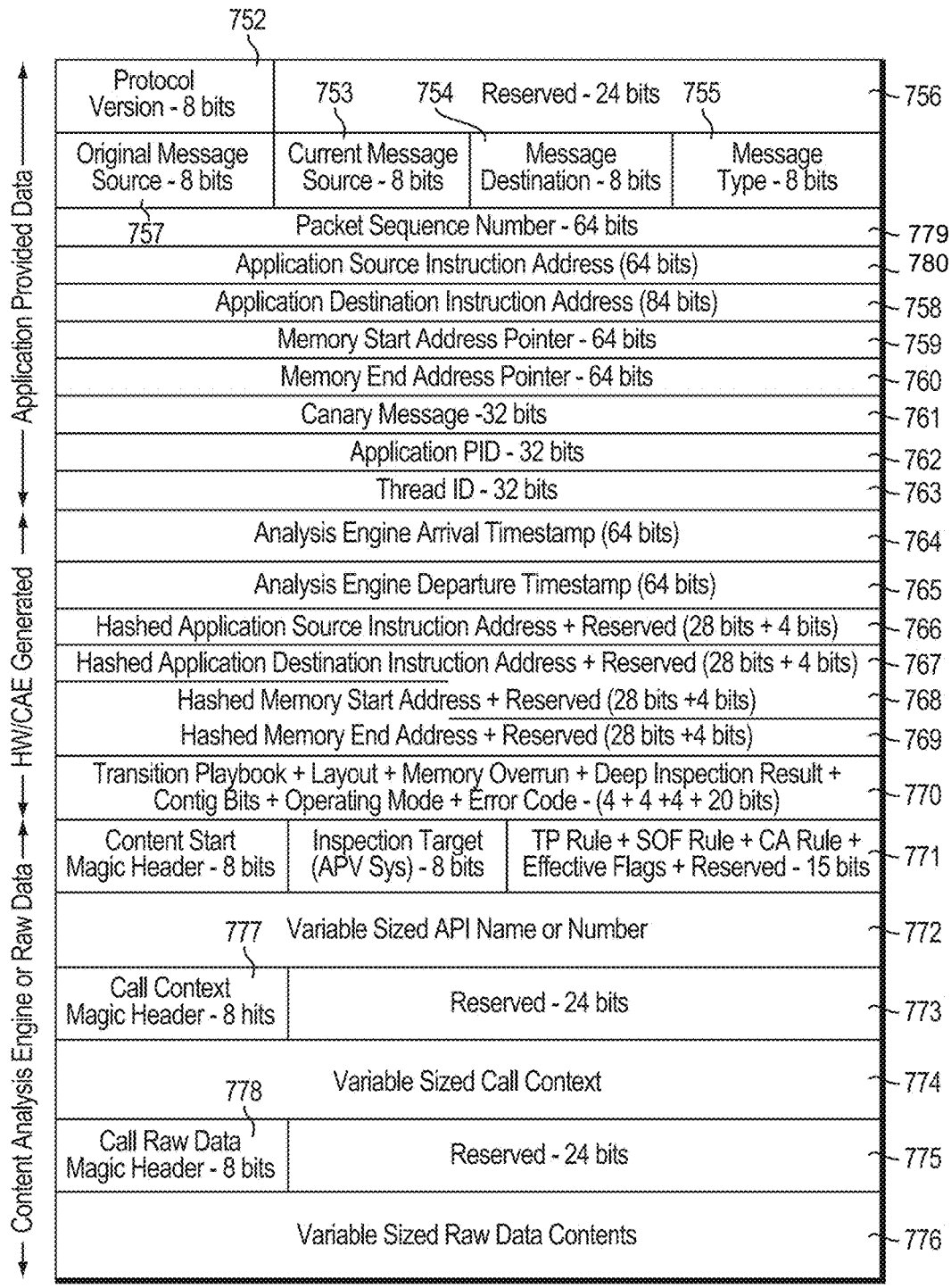
FIG. 7B illustrates an example protocol data unit (PDU) used to transmit data between the client and an analysis engine of FIG. 7A.

FIG. 7B illustrates an example protocol data unit (PDU) used to transmit data between the Monitoring Agent 702 and an Analysis Engine 728 of FIG. 7A. In order for the Monitoring Agent 702 and the Analysis Engine 728 to work effectively with each other, they communicate with each other using the PDU. The PDU can specifically be used by the Monitoring Agent 702 to package the extracted model of the application and/or collected runtime data for transmission to the Analysis Engine 728. The PDU contains fields for each type of information to be transmitted between the Monitoring Agent 702 and the Analysis Engine 728.

The PDU is Divided into the Application Provided Data Section, the HW/CVE Generated, and Content Analysis Engine or Raw Data sections.

The Application Provided Data Section contains data from various registers as well as source and target addresses that are placed in the various fields of this section. The Protocol Version contains the version number of the PDU 752. As the protocol version changes over time, the source and destination must be capable of continuing to communicate with each other. This 8 bit field describes the version number of the packet as generated by the source entity. A presently unused reserved field 756 follows the Protocol Version field.

The next field of the Application Provided Data Section is the Message Source/Destination Identifiers 757, 753, and 754 are used to exchange traffic within the Analysis Engine infrastructure as shown in FIG. 7. From time to time, the various entities shown in FIG. 7, exchange traffic between themselves. Not all these devices have or need IP addresses and therefore, the two (hardware and host) Query Router Engines uses the Message Source and Destination fields to route traffic internally. Some messages need to go across the network to entities in the Analysis Engine. For this purpose, the entities are assigned the following IDs. A given Analysis Engine appliance may have more than one accelerator card. Each card will have a unique IP address; therefore, the various entities will have a unique ID. The aforementioned infrastructure may also be running more than one application. Since each application server will have a unique IP address, the corresponding Monitoring Agent side entity will also have a unique ID.

Monitoring Agent Side Entities
1. GUI
2. Instrumentation and Analysis Engine
3. Client Message Router
4. Streaming Engine
5. Client Side Daemon
6. CLI Engine
7. Client Watchdog
8. Client Compression Block
9. Client iWarp/RDMA/ROCE Ethernet Driver (100 Mb/1 Gb/10 Gb)

Per PCI Card Entities (starting address=20+n*20)
20. Analysis Engine TOE block
21. Analysis Engine PCI Bridge
22. Decompression Block
23. Message Verification Block
24. Packet Hashing Block
25. Time-Stamping Block
26. Message Timeout Timer Block
27. Statistics Counter Block
28. Analysis Engine Query Router Engine
29. Analysis Engine Assist Analysis Engine Host Entities
200. Analysis Engine PCIe Driver
201. Host Routing Engine
202. Content Analysis Engine
203. Log Manager
204. Daemon
205. Web Engine
206. Watchdog
207. IPC Messaging Bus
208. Configuration Database
209. Log Database SIEM Connectors
220. SIEM Connector 1—Dashboard/CMS
221. SIEM Connector 2—HP ArcSight
222. SIEM Connector 3—IBM QRadar
223. SIEM Connector 4—Alien Vault USM Analysis Engine Infrastructure Entities
230. Dashboard/CMS
231. SMTP Server
232. LDAP Server
233. SMS Server
234. Entitlement Server
235. Database Backup Server
236. OTP Client
237. OTP Server
238. Checksum Server
239. Ticketing Server
240. Event Chain Upgrade Server
241. Software Update Server All User Applications
255. User Applications—Application PID is used to identify the application issuing a query Another field of the Application Provided Data section is the Message Type field which indicates the type of data being transmitted 755. At the highest level, there are three distinct types of messages that flow between the various local Monitoring Agent side entities, between the Analysis Engine appliance side entities and between Monitoring Agent side and appliance side entities. Furthermore, messages that need to travel over a network must conform to the OSI model and other protocols.

The following field of the Application Provided Data section is the Packet Sequence Number field containing the sequence identifier for the packet 779. The Streaming Engine will perform error recovery on lost packets. For this purpose it needs to identify the packet uniquely. An incrementing signed 64 bit packet sequence number is inserted by the Streaming Engine and simply passes through the remaining Analysis Engine infrastructure. If the sequence number wraps at the 64 bit boundary, it may restart at 0. In the case of non-application packets such as heartbeat or log message etc., the packet sequence number may be −1.

The Application Provided Data section also contains the Canary Message field contains a canary used for encryption purposes 761. The Monitoring Agent 702 and the Analysis Engine 728 know how to compute the Canary from some common information but of a fresh nature such as the Application Launch time, PID, the license string, and an authorized user name.

The Application Provided Data section additionally contains generic fields that are used in all messages. The Application Source Instruction Address 780, Application Destination Instruction Address 758, Memory Start Address Pointer 759, Memory End Address Pointer 760, Application PID 762, Thread ID 763, Analysis Engine Arrival Timestamp 764, and Analysis Engine Departure Timestamp 765 fields which hold general application data.

The PDU also contains the HW/CAE Generated section. In order to facilitate analysis and to maintain a fixed time budget, the Analysis Engine hashes the source and destination address fields and updates the PDU prior to processing. The HW/CAE Generated section of the PDU is where the hashed data is placed for later use. This section includes the Hashed Application Source Instruction Address 766, Hash Application Destination Instruction Address 767, Hashed Memory Start Address 768, and Hashed Memory End Address 769 fields. The HW/CAW Generated section additionally contains other fields related to the Canary 771 including the Hardcoded Content Start Magic header, API Name Magic Header, Call Context Magic Header and Call Raw Data Magic Header are present in all PDU packets.

The HW/CAE Generated section also includes a field 770 to identify other configuration and error data which includes Result, Configuration Bits, Operating Mode, Error Code, and Operating Modes data. The Result part of the field is segmented to return Boolean results for the different Analysis Engine queries—the transition playbook, the code layout, the Memory (Stack or Heap) Overrun, and the Deep Inspection queries. The Configuration Bits part of the field indicates when a Compression Flag, Demo Flag, or Co-located Flag is set. The presence of the flag in this field indicates to the Analysis Engine 728 whether the packet should be returned in compression mode. The Demo Flag indicates that system is in demo mode because there is no valid license for the system. In this mode, logs and events will not be available in their entirety. The Co-located Flag indicates that the application is being run in the Analysis Engine 728 so that Host Query Router Engine can determine where to send packets that need to return to the Application. If this flag is set, the packets are sent via the PCI Bridge, otherwise they are sent over the Ethernet interface on the PCI card. The Operating Mode part of the field indicates whether the system is in Paranoid, Monitor, or Learn mode. These modes will be discussed in more details later in this section. Lastly, the Error Code part of the field indicates an error in the system. The first eight bits of the error code will correspond to the message source. The remaining 12 bits will correspond to the actual error reported by each subsystem.

The PDU also contains the Content Analysis Engine or Raw Data. All variable data such as arguments and return value of the OS library calls and System Calls is placed in this section of the PDU. The data in this section contains the content of the data collected from the application and is primarily targeted at the Content Analysis Engine. This section contains the Variable Sized API Name or Number 772, the Call Content Magic Header 777, the Variable Sized Call Content 774, the Call Raw Data Magic Header 778, Variable Sized Raw Data Contents 776, and two reserved 773 and 775 fields. Furthermore, these fields can be overloaded for management messages.

Digital Processing Infrastructure

Figure 8:
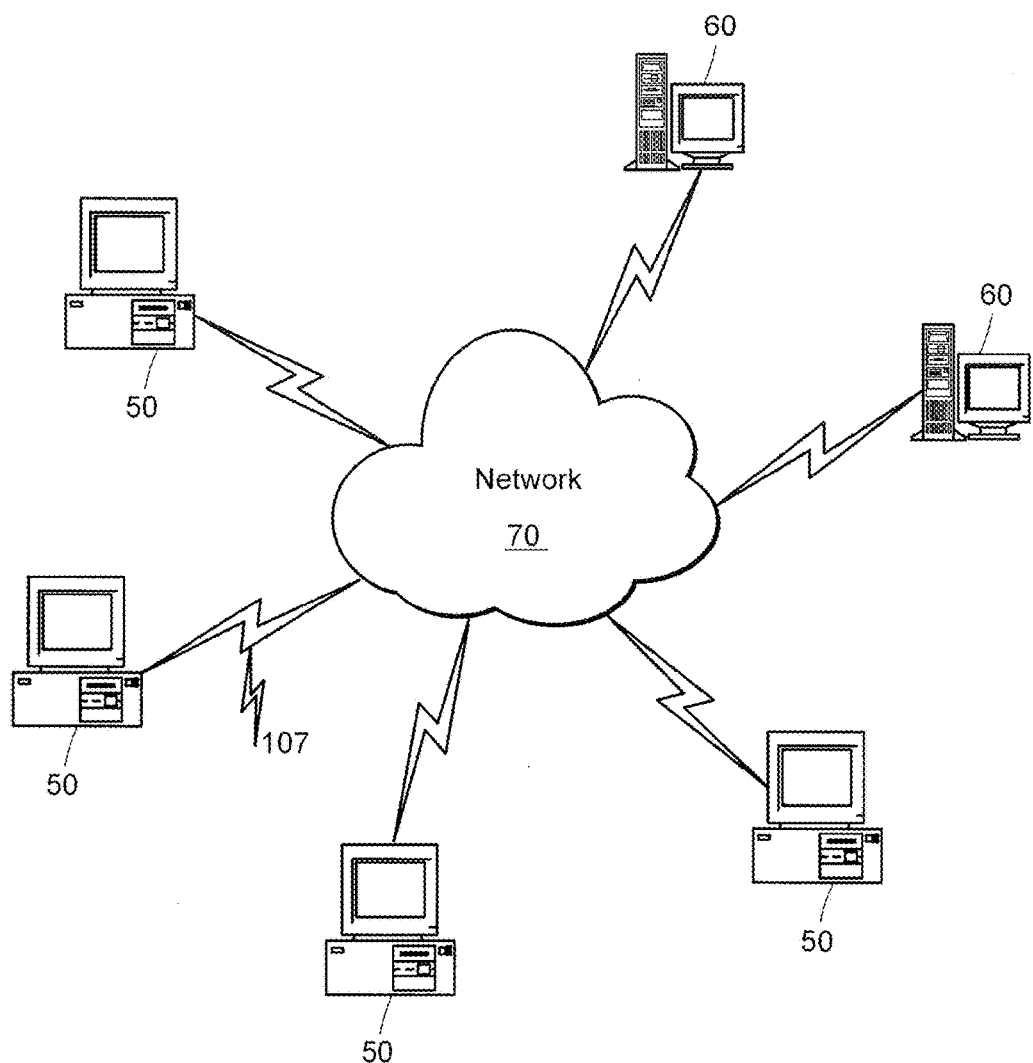
FIG. 8 illustrates a computer network or similar digital processing environment in which embodiments of the present disclosure may be implemented.

FIG. 8 illustrates a computer network or similar digital processing environment in which embodiments of the present disclosure may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Client computers/devices 50 may be configured with a monitoring agent. Server computers 60 may be configured as the analysis engine which communicates with client devices (i.e., monitoring agent) 50 for detecting security attacks. The server computers 60 may not be separate server computers but part of cloud network 70. In some embodiments, the server computer (e.g., analysis engine) may compare captured memory addresses to stored memory addresses in a golden table. The client (instrumentation engine) 50 may communicate golden table records, to the server (analysis engine) 60, containing the stored memory addresses. In some embodiments, the client 50 may include client applications or components (e.g., instrumentation engine) executing on the client (i.e., instrumentation engine) 50 for capturing active instructions and determining corresponding memory addresses, and the client 50 may communicate this information to the server (e.g., analysis engine) 60 in the golden table records.

Figure 9:
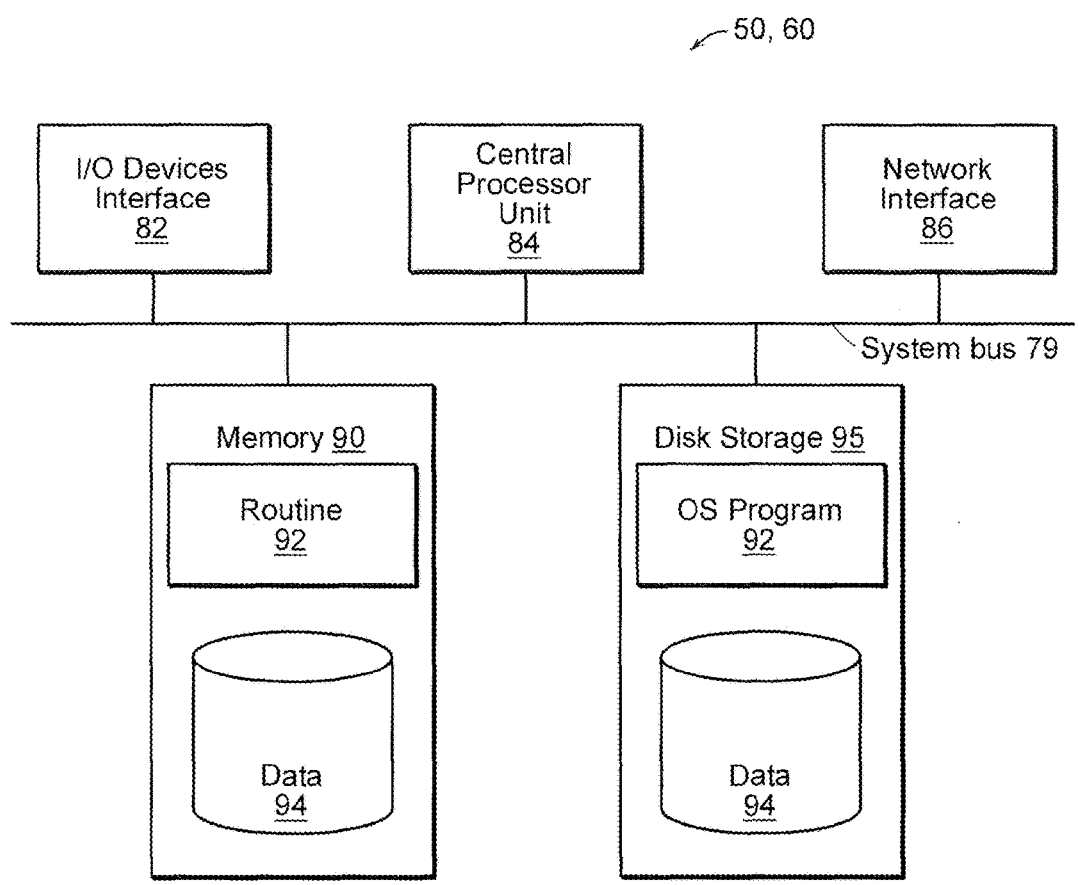
FIG. 9 illustrates a diagram of an example internal structure of a computer (e.g., client processor/device or server computers) in the computer system of FIG. 8.

FIG. 9 is a diagram of an example internal structure of a computer (e.g., client processor/device 50 or server computers 60) in the computer system of FIG. 8. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 8). Memory 90 provides volatile storage for computer software instructions 92 and data 94 used to implement an embodiment of the present disclosure (e.g., monitoring agent, instrumentation engine, and analysis engine elements described herein). Disk storage 95 provides non-volatile storage for computer software instructions 92 and data 94 used to implement an embodiment of the present disclosure. A central processor unit 84 is also attached to the system bus 79 and provides for the execution of computer instructions.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, hardware, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

The teachings of all patents, published applications and references cited herein are incorporated by reference in their entirety.

While this disclosure has been particularly shown and described with references to example embodiments thereof, it will be understood by those skilled in the art that various changes in form and details may be made therein without departing from the scope of the disclosure encompassed by the appended claims.

What is claimed is:

1. A method for preventing malicious exploitation of a computer application, the method comprising:
   providing the computer application to an entity, the computer application having a plurality of functionalities, wherein the plurality of functionalities include functionalities used by the entity, and functionalities not used by the entity;
   determining a set of instructions from available instructions of the computer application, wherein the determined set of instructions provide specific functionality of the computer application, and the specific functionality is a subset of the functionalities used by the entity;
   once the set of instructions is determined, for each of respective instructions of the available instructions of the computer application not in the determined set of instructions, generating a modified computer application to prevent malicious exploitation of each of the respective instructions by changing each of the respective instructions of the computer application to an inoperative instruction, wherein the changing overwrites each of the respective instructions of the computer application with an instruction having no operation;
   in response to the generating a modified computer application, capturing a memory address of the modified computer application being accessed at runtime; and
   declaring a security attack if the captured memory address matches a memory address for at least one inoperative instruction of the modified computer application.

2. The method of claim 1, wherein the determining a set of instructions further comprises:
   performing functional testing on the specific functionality of the computer application; and capturing instructions executed during the functional testing.

3. The method of claim 2, further comprising:
   performing negative testing on the specific functionality, wherein the negative testing triggers exception handling functions respective to the specific functionality; and
   capturing instructions executed by the triggering the exception handling functions.

4. The method of claim 2, further comprising:
   capturing instructions for exception handling functions by statically analyzing structure of threads executing the specific functionality during the functional testing.

5. The method of claim 1, wherein the changing each of the respective instructions to an inoperative instruction is permanent.

6. The method of claim 1, wherein the changing each of the respective instructions to an inoperative instruction comprises overwriting each of the respective instructions with the instruction having no operation during load time.

7. The method of claim 1, wherein the changing each of the respective instructions to an inoperative instruction comprises overwriting each of the respective instructions with the instruction having no operation during runtime.

8. The method of claim 1, wherein the changing each of the respective instructions to an inoperative instruction comprises overwriting each of the respective instructions with a NOP instruction.

9. The method of claim 1, further comprising:
   reorganizing the determined set of instructions in memory and writing the reorganized determined set of instructions to a smaller memory space.

10. The method of claim 9, further comprising:
    randomizing the reorganized determined set of instructions in memory prior to writing to the smaller memory space.

11. The method of claim 1, wherein the specific functionality is dependent on class of a user executing the computer application.

12. The method of claim 1, further comprising:
    writing memory addresses for the determined set of instructions to a table loading on a hardware processor.

13. The method of claim 1, wherein the computer application includes at least one of executables and libraries.

14. A system for preventing malicious exploitation of a computer application, the system comprising:
    at least one hardware processor configured to implement:
    an instrumentation engine configured to:

provide the computer application for an entity, the computer application having a plurality of functionalities, wherein the plurality of functionalities include functionalities used by the entity, and functionalities not used by the entity;

determine a set of instructions from available instructions of the computer application, wherein the determined set of instructions provide specific functionality of the computer application, and the specific functionality is a subset of the functionalities used by the entity;

once the set of instructions is determined, for each of respective instructions of the available instructions of the computer application not in the determined set of instructions, generate a modified computer application to prevent malicious exploitation of each of the respective instructions by changing each of the respective instructions of the computer application to an inoperative instruction, wherein the changing overwrites each of the respective instructions of the computer application with an instruction having no operation;

an analysis engine communicatively coupled to the instrumentation engine, the analysis engine configured to, in response to the generating a modified computer application, capture a memory address of the modified computer application being accessed at runtime; and a validation engine communicatively coupled to the analysis engine and the instrumentation engine, the validation engine configured to declare a security attack if the captured memory address matches a memory address for at least one inoperative instruction of the modified computer application.

15. The system of claim 14, wherein the instrumentation engine is further configured to:

monitor functional testing being performed on the specific functionality of the computer application; and capture instructions executed during the functional testing.

16. The system of claim 15, wherein the instrumentation engine is further configured to:

monitor negative testing being performed on the specific functionality, wherein the negative testing triggers exception handling functions respective to the specific functionality; and capture instructions executed by the triggering the exception handling functions.

17. The system of claim 15, wherein the instrumentation engine is further configured to capture instructions for exception handling functions by statically analyzing structure of threads executing the specific functionality.

18. The system of claim 14, wherein the changing each of the respective instructions to an inoperative instruction is permanent.

19. The system of claim 14, wherein the changing each of the respective instructions to an inoperative instruction comprises overwriting each of the respective instructions with the instruction having no operation during load time.

20. The system of claim 14, wherein the changing each of the respective instructions to an inoperative instruction comprises overwriting each of the respective instructions with the instruction having no operation during runtime.

21. The system of claim 14, wherein the changing each of the respective instructions to an inoperative instruction comprises overwriting each of the respective instructions with a NOP instruction.

22. The system of claim 14, wherein the instrumentation engine is further configured to:

reorganize the determined set of instructions in memory and write the reorganized determined set of instructions to a smaller memory space.

23. The system of claim 22, wherein the instrumentation engine is further configured to:

randomize the reorganized determined set of instructions in memory prior to writing to the smaller memory space.

24. The system of claim 14, wherein the specific functionality is dependent on class of a user executing the computer application.

25. The system of claim 14, wherein the instrumentation engine is further configured to:

write memory addresses for the determined set of instructions to a table for loading on the at least one hardware processor.

26. The system of claim 14, wherein the computer application includes at least one of executables and libraries.

27. The system of claim 14, wherein the analysis engine, the instrumentation engine, and the validation engine comprise a processor fabric including one or more processors.

* * * * *